June 14, 1927.
G. W. YANNEY
1,632,574
BEET HANDLING APPARATUS
Filed Oct. 5, 1921
4 Sheets-Sheet 1
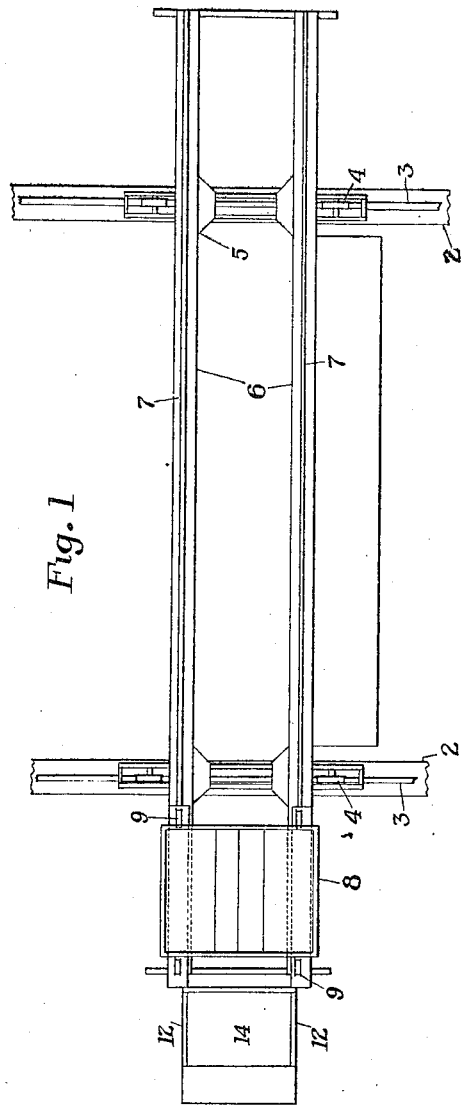
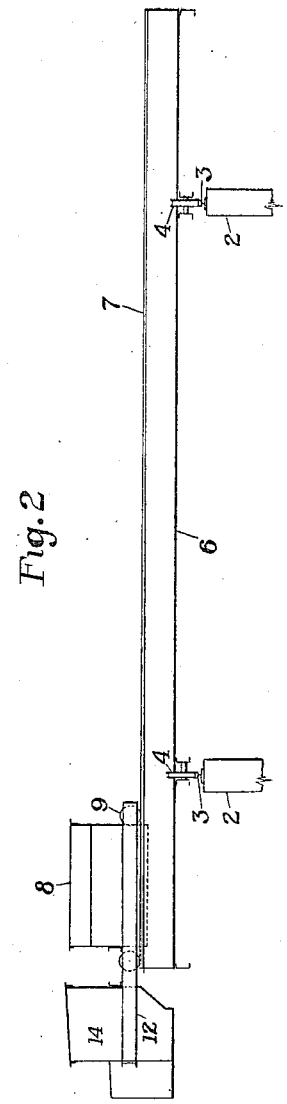

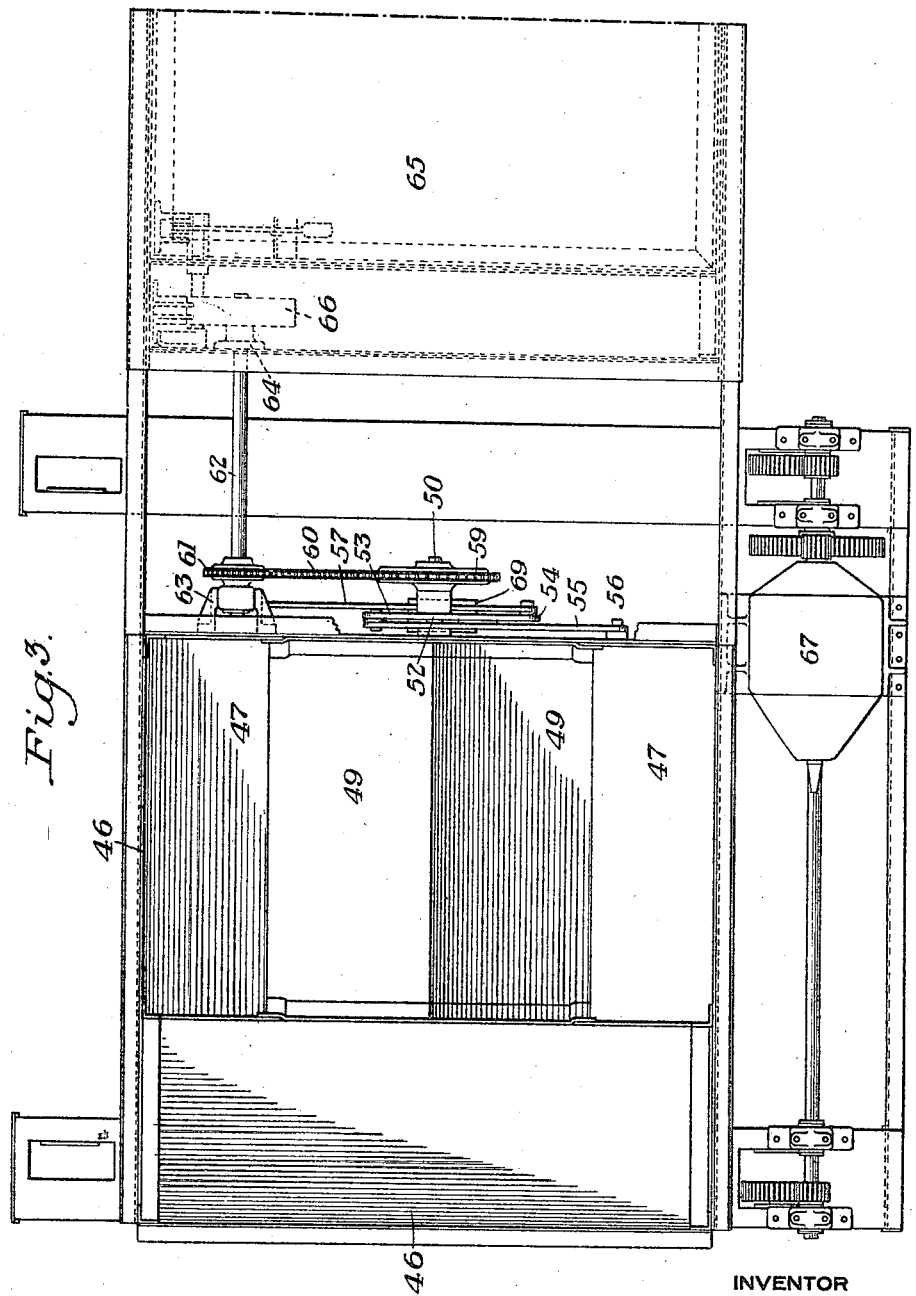

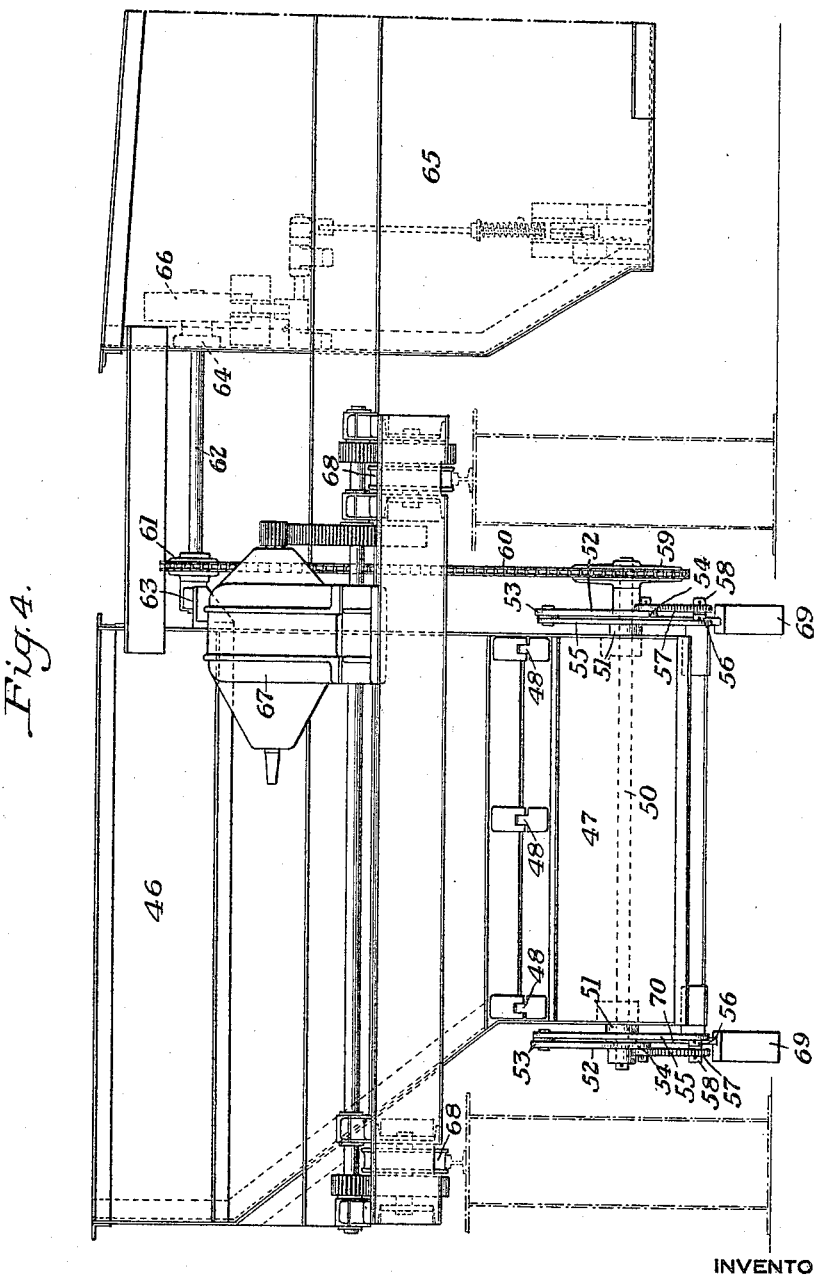

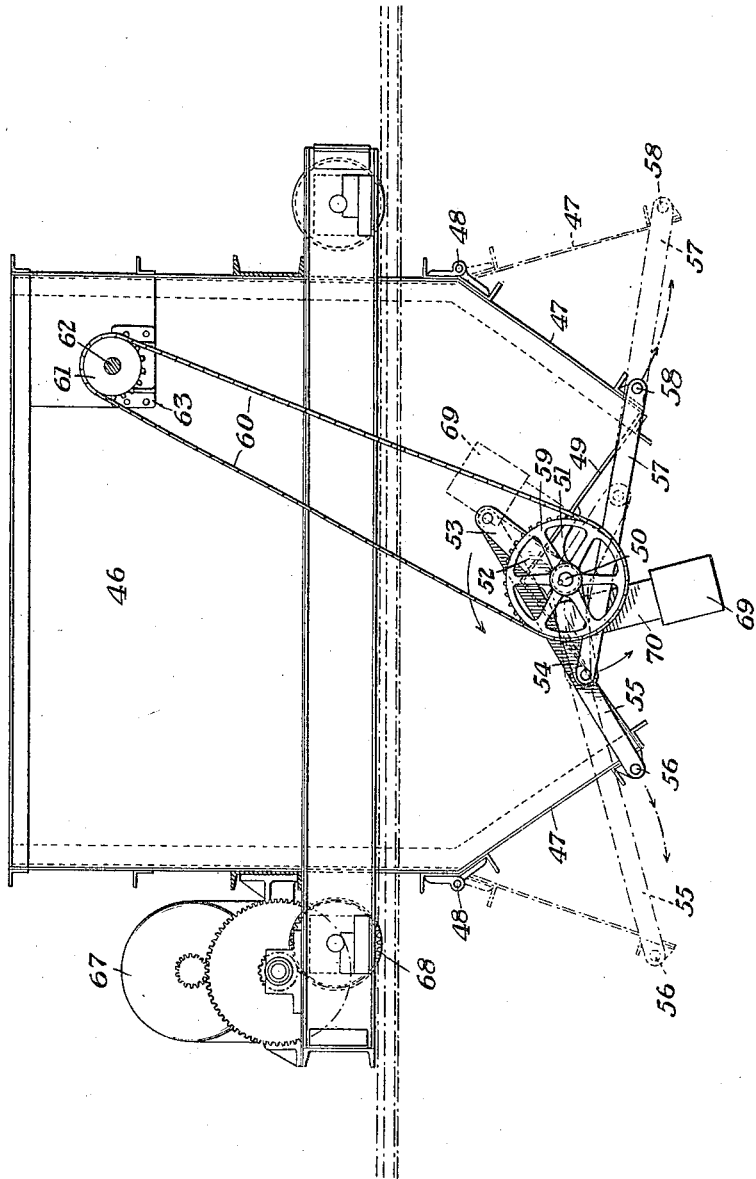

Patented June 14, 1927.

1,632,574

UNITED STATES PATENT OFFICE.

GEORGE W. YANNEY, OF ALLIANCE, OHIO, ASSIGNOR TO THE ALLIANCE MACHINE COMPANY, OF ALLIANCE, OHIO, A CORPORATION OF OHIO.

BEET-HANDLING APPARATUS.

Application filed October 5, 1921. Serial No. 505,497.

The present invention relates generally to carrying and dumping apparatus of the crane and bridge type, but more particularly to an apparatus for handling beets.

The principal object of the present invention is to provide an apparatus which may receive a load of beets and carry the same to any desired point where they are automatically dumped by the weight of the load.

A further object of the present invention is to provide a hopper having gates in the bottom which are normally held in closed position by suitable mechanism, which mechanism may be released when the hopper is loaded to permit the same to discharge.

Still another object of the present invention is to provide a hopper adapted to travel on a bridge with means for propelling the hopper and controlling the operation thereof.

The foregoing and other objects, together with their attendant advantages, will be apparent as the invention becomes better understood, by reference to the accompanying specification and drawings forming a part thereof, it being premised that changes may be made in the various details and the manner of operation, within the scope of the appended claims, without departing from the spirit of the invention.

Figure 1 is a plan view, largely diagrammatic, illustrating my improved apparatus.

Figure 2 is a side elevation of the apparatus illustrated in Figure 1.

Figure 3 is a top plan view of a modified form of apparatus embodying the present invention.

Figure 4 is a side elevation of the construction illustrated in Figure 3.

Figure 5 is an end elevation of the construction illustrated in Figure 3.

Referring more particularly to the drawings, there is illustrated in Figs. 1 and 2 the upper portion of a suitably constructed supporting structure 2 carrying rails 3 for the wheels 4 of a bridge crane 5. This crane may be of any usual construction comprising main side beams 6 carrying longitudinally extending rails 7. Mounted to travel on the rails 7 is a hopper 8 mounted on wheels 9. Extending from one end of the hopper 8 is a frame-work 12 carrying a cage or platform 14 for the operator.

The sides of the hopper may be provided with pivotally mounted downwardly swinging gates. It has been proposed to mount such gates to be controlled by a system of flexible cables and counter-weights, but such construction has been found to be disadvantageous for numerous reasons.

In accordance with the present invention, all flexible cables are eliminated, and a control system for the gates embodying operating links, which are in turn controlled by a counter-weight, is provided. Such a construction is illustrated more particularly in Figs. 3, 4, and 5 of the drawings in which figures there is illustrated a hopper 46 having secured to each of its sides in any desired manner a semi-vertical gate 47 adapted to swing in a substantially horizontal direction about its pivotal mounting 48. The lower edge of each of the gates 47 cooperates with a stationary bottom portion 49 which is preferably inclined from the center line of the hopper to direct the beets toward the gates. Extending longitudinally of the hopper below the bottom 49, is a shaft 50, mounted in suitable brackets 51 secured to the bottom of the hopper. Secured adjacent each end of the shaft 50, is an actuating member 52 having angularly extending arms 53 and 54, respectively. Pivotally secured to each of the arms 53, is a link 55 having its opposite end pivotally connected to a pin 56 carried by the lower edge of one of the gates 47. In like manner, there is provided a link 57 pivotally secured to each of the arms 54 and connected at its opposite end to a pin 58 carried by the lower edge of the other gate 47. As illustrated, these links 55 and 57 may be secured to the actuating members 52 on opposite sides thereof, although it will be readily understood that by properly shaping the links they may be secured to the same side of each of the actuating members.

On one end of the shaft 50, beyond the actuating member 52, is secured a sprocket wheel 59 cooperating with a sprocket chain 60 which passes around a second sprocket wheel 61 on a shaft 62 journaled at one end in a suitable bearing 63 provided on the hopper body, and at its opposite end in a bearing 64 carried by the operator's cage 65. Secured to the shaft 62 is a brake drum 66, with which a suitable brake mechanism cooperates.

With a construction of this type, it will be apparent that after the hopper has been moved by its motor 67, which drives supporting wheels 68, to the desired position, the hopper may be completely emptied by releasing the brake band from the brake drum 66. For automatically returning the gates 47 to their closed positions after the hopper is emptied, there is provided for each of the actuating members 52 a counterweight 69. Each of the counterweights is carried by a suitable supporting arm 70 secured in any desired manner to the arm 54 of the actuating member. In normal position, that is, with the gates closed, the counterweight lies below the actuating member, with its supporting arm extending in a substantially vertical direction. During the opening movement of the gates, the counterweight shown in Figure 5 moves in a counter-clockwise direction into the dotted line position illustrated. It will be apparent that as soon as the hopper is emptied these counterweights will automatically return to their normal positions, thereby closing the gates and preparing the hopper for another load. The gates, as will be readily understood from the foregoing description, are maintained in closed position by the brake mechanism provided for this purpose.

The advantages of the present invention arise from a construction in which a load of beets may be readily transferred from one point to another and dumped automatically. Further advantages arise from the means provided for automatically closing the dumping gates after each operation thereof so that the hopper is ready to receive a new load.

By the term "hopper" as employed throughout the specification and claims, there is meant any desired form of car or carrier adapted to receive the material being handled.

I claim:

1. An apparatus of the class described, comprising a movable hopper, a plurality of discharging gates carried thereby, a counterweight for holding said gates in closed position when the hopper is empty, a manually controlled automatically released brake cooperating with said counterweight to hold the gates in closed position when the hopper is loaded, and flexible tension means intermediate said brake and said gates, substantially as described.

2. An apparatus of the class described, comprising a hopper, a discharge gate carried thereby, a link pivoted to said gate and movable therewith, an actuating member cooperating with said link, and gravity operated motive means tending normally to maintain said actuating member in a predetermined position, said means being effective for moving said gate to closed position, substantially as described.

3. An apparatus of the class described, comprising a hopper, a discharge gate carried thereby, a link secured directly to said gate and movable therewith, an actuating member cooperating with said link, and a counterweight for maintaining said actuating member normally in a predetermined position, substantially as described.

4. An apparatus of the class described, comprising a hopper, discharge gates carried thereby, a link connected to each of said gates and movable therewith, an actuating member cooperating with said links for causing the same to move in unison, and a counterweight for normally maintaining said actuating member in a predetermined position, substantially as described.

5. An apparatus of the class described, comprising a hopper, a discharge gate carried thereby, a shaft adjacent the bottom of the hopper, an actuating member on each end of such shaft, a link connected to said gate and cooperating with each actuating member, and means tending normally to maintain said actuating members in a predetermined position, substantially as described.

6. An apparatus of the class described, comprising a hopper, a discharge gate carried thereby, a shaft extending longitudinally of the hopper adjacent the bottom thereof, an actuating member carried by said shaft adjacent each end thereof, a link connected to said gate and to each actuating member, and a counterweight carried by each actuating member for normally maintaining the same in a predetermined position, substantially as described.

7. An apparatus of the class described, comprising a hopper, means for moving the same, a discharge gate carried thereby, automatically operable means located entirely outside of said hopper and at the ends or bottom thereof for normally holding said gate in closed position only when the hopper is substantially empty, a common shaft located entirely at one end of the hopper to which said means is connected, and friction-holding means for said shaft for preventing said gate from automatically opening when the hopper is loaded, substantially as described.

8. An apparatus of the class described, comprising a hopper, means for moving the same, a discharge gate carried thereby, automatically operable means located entirely outside of said hopper and at the ends or bottom thereof for normally holding said gate in closed position only when the hopper is substantially empty, and friction means for preventing said gate from automatically opening when the hopper is loaded, substantially as described.

9. Apparatus of the class described, comprising a hopper, means for moving the same, a discharge gate carried thereby, a counterweight operable for holding said gate in closed position only when the hopper is substantially empty, friction means for preventing said gate from opening when the hopper is loaded, and an operating connection between said counterweight and said means located entirely at the ends or bottom of the hopper whereby the hopper has an unobstructed charging opening, substantially as described.

10. An apparatus of the class described, comprising a hopper, a discharge gate carried thereby, a counterweight for normally holding said gate in closed position when the hopper is empty, a manually controlled automatically released brake cooperating with said counterweight for holding the gate in closed position when the hopper is loaded, and a flexible tension member intermediate said brake and said gate, substantially as described.

In testimony whereof I have hereunto set my hand.

GEORGE W. YANNEY.